United States Patent
Aljerf et al.

(10) Patent No.: US 9,228,625 B2
(45) Date of Patent: Jan. 5, 2016

(54) AMORPHOUS METAL ALLOY

(71) Applicant: ROLEX S.A., Geneva (CH)

(72) Inventors: Moustafa Aljerf, Saint Martin d'Heres (FR); Konstantinos Georgarakis, La Tronche (FR); Thomas Gyger, Le Fuet (CH); Alain Le Moulec, Gieres (FR); Vincent von Niederhäusern, Courrendlin (CH); Alain Yavari, La Tronche (FR)

(73) Assignee: ROLEX S.A., Geneva (CH)

(*) Notice: Subject to any disclaimer, the term of this patent is extended or adjusted under 35 U.S.C. 154(b) by 199 days.

(21) Appl. No.: 13/747,104

(22) Filed: Jan. 22, 2013

(65) Prior Publication Data

US 2013/0126054 A1 May 23, 2013

Related U.S. Application Data

(63) Continuation-in-part of application No. PCT/IB2011/001644, filed on Jul. 12, 2011.

(30) Foreign Application Priority Data

Jul. 21, 2010 (EP) .................................... 10356022

(51) Int. Cl.

| | | |
|---|---|---|
| C22C 45/02 | (2006.01) | |
| B22D 21/00 | (2006.01) | |
| F16F 1/02 | (2006.01) | |
| C22C 19/07 | (2006.01) | |
| C22C 38/00 | (2006.01) | |
| C22C 45/00 | (2006.01) | |
| C22C 1/00 | (2006.01) | |
| C22C 33/00 | (2006.01) | |
| C22C 45/04 | (2006.01) | |

(52) U.S. Cl.
CPC ................ *F16F 1/021* (2013.01); *C22C 1/002* (2013.01); *C22C 19/07* (2013.01); *C22C 33/003* (2013.01); *C22C 38/00* (2013.01); *C22C 45/008* (2013.01); *C22C 45/02* (2013.01); *C22C 45/04* (2013.01)

(58) Field of Classification Search
None
See application file for complete search history.

(56) References Cited

U.S. PATENT DOCUMENTS

| | | |
|---|---|---|
| 4,365,994 A | 12/1982 | Ray |
| 4,755,239 A | 7/1988 | O'Handley |
| 6,843,594 B1 | 1/2005 | Moteki et al. |
| 2003/0150528 A1 | 8/2003 | Martis et al. |
| 2007/0144618 A1* | 6/2007 | Adar .............................. 148/304 |
| 2009/0303842 A1 | 12/2009 | Gritti et al. |
| 2012/0281510 A1 | 11/2012 | Gyger et al. |
| 2013/0133788 A1* | 5/2013 | Aljerf et al. .................. 148/548 |

FOREIGN PATENT DOCUMENTS

| | | |
|---|---|---|
| EP | 0 018 096 A1 | 10/1980 |
| EP | 0 072 893 A1 | 3/1983 |
| EP | 0 942 337 A1 | 9/1999 |
| FR | 1108101 A | 1/1956 |
| JP | 57-108237 A | 7/1982 |
| JP | 4-124246 A | 4/1992 |
| JP | 2001-279387 A | 10/2001 |
| WO | 01/31085 A1 | 5/2001 |
| WO | 2008/125281 A1 | 10/2008 |
| WO | 2010/000081 A1 | 1/2010 |
| WO | 2011/069273 A1 | 6/2011 |
| WO | 2012/010941 A1 | 1/2012 |

OTHER PUBLICATIONS

International Search Report for PCT/IB2011/001644, mailing date of Aug. 13, 2012.

T. Zhang and A. Inoue, "A New Method for Producing Amorphous Alloy Wires", Materials Transactions, JIM, vol. 41, No. 11, pp. 1463-1466, (2000).

X.J. Gu and S.J. Poon, "Mechanical properties of iron-based bulk metallic glasses", J. Mater. Res., vol. 22, No. 2, pp. 344-351, (2007).

K. Hajlaoui et al., "Shear delocalization and crack blunting of a metallic glass containing nanoparticles: In situ deformation in TEM analysis", Scripta Materialia 54, pp. 1829-1834, (2006).

A.O. Olofinjana, "Effects of process variables on the multi-strand casting of high strength sub-millimetre metallic glass wire", Journal of Materials Processing Technology 155-156, pp. 1344-1349, (2004).

Q. Wang et at., "Co- and Fe-based multicomponent bulk metallic glasses designed by cluster line and minor alloying", J. Mater. Res. vol. 23, No. 6, pp. 1543-1550, Jun. (2008).

A. R. Yavari et al., "On the nature of the remaining amorphous matrix after nanocrystallization of Fe77Si14B9 with Cu and Nb addition", Materials Science and Engineering, A181/A182, pp. 1415-1418, (1994).

Office Action dated Aug. 21, 2015, issued in co-pending U.S. Appl. No. 13/747,084 (6 pages).

* cited by examiner

*Primary Examiner* — George Wyszomierski

(74) *Attorney, Agent, or Firm* — Westerman, Hattori, Daniels & Adrian, LLP

(57) ABSTRACT

The invention relates to an amorphous metal alloy which may be used in the field of mechanical applications, in particular as a spring. This amorphous metal alloy corresponds to the formula $Fe_aCO_bNi_cNb_dV_eB_fTa_g$ in which: $0 \leq a \leq 70$; $0 \leq b \leq 70$; $8 < c \leq 60$; $1 \leq d \leq 19$; $1 \leq e < \leq 10$; $12 \leq f \leq 25$; $0 \leq g \leq 5$; with $20 \leq a+b \leq 70$; $50 \leq a+b+c \leq 90$; $5 \leq d+e \leq 20$; and $a+b+c+d+e+f+g=100$.

23 Claims, No Drawings

AMORPHOUS METAL ALLOY

This application is a continuation-in-part of PCT/IB2011/001644 filed Jul. 12, 2011, and claims priority of European application No. 10356022.3 filed Jul. 21, 2010, each of which is hereby incorporated by reference in its entirety herein. The invention relates to an amorphous metal alloy that can be used in the field of mechanical applications, in particular for a spring.

BACKGROUND OF THE INVENTION

A particular feature of the amorphous metal alloys, also called metallic glasses, is that they do not have long-range atomic order. They are of considerable interest for mechanical applications as they can have a high breaking stress and a wide range of elastic loading. In general, metallic glasses have a far higher breaking stress than crystalline alloys with equivalent Young's modulus.

These materials have a very high Ashby index $\sigma^2/E$, which positions them as materials of choice for making springs for energy storage. However, a study of the mechanical properties of metallic glasses shows that only metallic glasses based on Fe or Co would be capable of competing with the best known spring steels and alloys. Among these alloys, there are the Fe—Si or Fe—Co—Si or Fe—Si—B alloys used for their magnetic properties in the form of ribbons about thirty microns in thickness in the cores of inductors, as well as alloys intended for forming bulk metallic glasses, for example in [Gu et al., Mechanical properties of iron-based bulk metallic glasses, J. Mater. Res. 22, 258 (2007)]. It is also known that these alloys are brittle, either after shaping in the case of magnetic tapes, or intrinsically brittle in the case of bulk metallic glasses.

Now, mechanical application, notably as a spring, requires tolerance to plastic deformation and/or fatigue strength, which implies a certain ductility of the material. Moreover, most of these alloys are magnetizable, which can cause disturbances of certain elements of a mechanism.

Some scientific works mention the existence of plasticity for certain compositions of metallic glasses based on Fe or Co, for example $Fe_{59}Cr_6Mo_{14}C_{15}B_6$ disclosed in the work mentioned above.

European patent application EP 0018096 relates to powders consisting of ultrafine grains of transition metal alloy containing boron, notably at the rate of 5 to 12 at %. These powders are intended for the manufacture of cutting tools.

European patent application EP 0072893 relates to metallic glasses essentially consisting of 66 to 82 at % of iron, of which 1 to 8% can optionally be replaced with at least one element selected from nickel, cobalt and mixtures thereof, from 1 to 6 at % of at least one element selected from chromium, molybdenum, tungsten, vanadium, niobium, tantalum, titanium, zirconium and hafnium and from 17 to 28 at % of boron of which 0.5 to 6% can optionally replaced with silicon and 2% at most can be replaced with carbon. These metallic glasses are intended for tape recorder reading heads, cores of relays, transformers and similar equipment.

International patent application WO 2010/000081 describes the use of a ribbon consisting of an amorphous metal alloy of formula $Ni_{53}Nb_{20}Zr_8Ti_{10}Co_6Cu_3$ as barrel spring.

Despite numerous tests on compositions known in the state of the art, for example $Fe_{59}Cr_6Mo_{14}C_{15}B_6$, the inventors were unable to obtain results usable for the intended applications in mechanics, owing to the brittleness of the material obtained in the form of ribbon. Therefore they searched for alloys specifically suited to the requirements of mechanical applications.

More precisely, the inventors have defined specifications that an essentially amorphous metal alloy must satisfy in order to be used in a mechanical application, more particularly as a spring element. Thus, the metal alloy must:

allow the production of a metallic glass (amorphous alloy) with a thickness of 1 micron or more, in the form of ribbon produced for example by rapid solidification ("melt-spinning" or "planar flow casting"), or in the form of thin wire produced for example by water quenching (A. O. Olofinjana et al., J. of Materials Processing Tech. Vol. 155-156 (2004) pp. 1344-1349) or by disk quenching (T. Zhang and A. Inoue, Mater. Trans. JIM, Vol. 41 (2000) pp. 1463-1466);

have high mechanical strength;

preferably, be ductile in the form of a ribbon or wire as described above, i.e. does not break when stressed to 180° (diameter at break less than 1 mm when the ribbon or wire is folded on itself) and having a range of plastic deformation;

preferably have a capacity for annealing (i.e. no degradation of the mechanical properties following a heat treatment for forming).

SUMMARY OF THE INVENTION

The invention relates to an amorphous metal alloy different from those mentioned above and satisfying the criteria defined in the aforementioned specification, such that it can be used in mechanics.

This alloy corresponds to the following general formula:

$Fe_aCo_bNi_cNb_dV_eB_fTa_g$ in which:

$0 \leq a \leq 70$;
$0 \leq b \leq 70$;
$8 < c \leq 60$;
$1 \leq d \leq 19$;
$1 \leq e \leq 10$;
$12 < f \leq 25$;
$0 \leq g \leq 5$;
with
$20 \leq a+b \leq 70$;
$50 \leq a+b+c \leq 90$;
$5 \leq d+e \leq 20$; and
$a+b+c+d+e+f+g=100$.

The invention also relates to a method of preparing the amorphous metal alloy according to the invention, comprising the following steps:

a) pre-melting the pure metallic elements Fe and/or Co, Ni, Nb and V and possibly Ta in a container;

b) heating boron, so as to remove any gas molecules that it contains;

c) mixing the pre-melted metallic elements and the solid boron;

d) heating the mixture obtained;

e) cooling it;

f) optionally repeating steps d) and e) one or more times, the last step e) being a hyperquench.

Other features and advantages of the invention will now be described in detail in the following account.

DETAILED DESCRIPTION OF THE INVENTION

In the present description, "amorphous metal" means a substantially amorphous metal-based alloy, consisting predominantly of an amorphous phase, i.e. whose volume fraction of the amorphous phase or phase(s) in all of the material exceeds 50%.

According to the invention, to be able to meet the aforementioned specification, the amorphous metal alloy according to the invention must correspond to the general formula mentioned above. The sum of the indices a to g being equal to 100 is equivalent to saying that it is a question of atomic percentages (at %).

According to a preferred embodiment of the invention, the indices a to g of the general formula satisfy the following conditions:
$0 \leq a \leq 60$;
$0 \leq b \leq 60$;
$10 \leq c \leq 50$;
$2 \leq d \leq 17$;
$2 \leq e \leq 8$;
$14 \leq f \leq 20$;
$0 \leq g \leq 4$;
with
$25 \leq a+b \leq 65$;
$60 \leq a+b+c \leq 80$; and
$8 \leq d+e \leq 17$.
More preferably:
$0 \leq a \leq 56$;
$0 \leq b \leq 54$;
$12 \leq c \leq 40$;
$4 \leq d \leq 14$;
$4 \leq e \leq 6$;
$15 \leq f \leq 17$;
$0 \leq g \leq 4$;
with
$30 \leq a+b \leq 60$;
$68 \leq a+b+c \leq 75$; and
$11 \leq d+e \leq 15$.

According to another advantageous embodiment of the invention, the amorphous metal alloy according to the invention lacks iron, i.e. a=0. It can have the following preferred values:
$31 \leq b \leq 56$;
$13 \leq c \leq 41$;
$7 \leq d \leq 13$;
$4 \leq e \leq 10$; and
$13 \leq f \leq 17$.

If in addition g=0, the amorphous metal alloy then belongs to the system Co—Ni—Nb—V—B.

According to another advantageous embodiment of the invention, the amorphous metal alloy according to the invention lacks cobalt, i.e. b=0. If in addition g=0, the alloy then belongs to the system Fe—Ni—Nb—V—B. It can have the following preferred values:
$47 \leq a \leq 57$;
$17 \leq c \leq 23$;
$3 \leq d \leq 9$;
$4 \leq e \leq 10$; and
$13 \leq f \leq 17$.

According to another embodiment of the invention, the amorphous metal alloy must contain iron and cobalt, i.e. a and b are both different from zero.

Method of Preparation

The amorphous metal alloy according to the invention as defined above can be prepared as follows:

a) pre-melting the pure metallic elements Fe (99.95%) and/or Co (99.95%), Ni (99.98%), Nb (99.99%) and V (99.8%) and possibly Ta in a container arranged in a furnace, for example an arc furnace of model MAM1 made by Edmund Bühler, under an inert atmosphere, for example argon, so as to remove any oxides contained in the metals;

b) heating boron in the almost pure state (99.5%) in a quartz crucible surrounded by a graphite crucible heated by induction to high temperature, for example 1200° C., and under partial vacuum, of the order of $10^{-6}$ mbar, in order to effect degassing, i.e. removal of any gas molecules, such as oxygen, nitrogen and oxides present in the boron;

c) putting the elements in a furnace, notably an arc furnace;

d) heating the whole, preferably for a time of less than 1 minute, under an inert atmosphere, for example argon, to a temperature well above the melting point of the alloy;

e) leaving to cool under an inert atmosphere;

f) repeating the cycle of steps d) and e) several times, so as to homogenize the alloy. To obtain an amorphous structure from the alloy produced, the last step e) of cooling after melting the alloy (step d) must be a hyperquench. Here, hyperquench means ultrafast quenching, i.e. cooling at a rate exceeding 1000 K/s, which makes it possible to vitrify the alloy. The alloy can then be cast in the form of ribbon or wire.

Any forming process or method can then be used. We may mention for example the method forming the object of the aforementioned international application WO2010/000081.

According to an advantageous embodiment of the invention, the hyperquench and casting of the alloy in the form of ribbon or wire are performed simultaneously, by discharging the molten alloy onto one or two rotating wheels, for example employing the method called "twin roll casting" (casting between two wheels), or better still, the method called PFC ("planar flow casting").

The PFC method consists essentially of heating the alloy by induction, in a boron nitride crucible, to a temperature 100° C. above its melting point, under helium partial pressure (typically 500 mbar). The alloy is then discharged through a nozzle onto a copper cooling wheel rotating at high speed. In this way a ribbon that is rectilinear and has an excellent surface condition is obtained directly.

According to another advantageous embodiment of the invention, step c) of the method is divided into substeps of formation of partial mixtures so as to form pre-alloys whose melting point Tm is well below that of the individual constituents.

For example, for the alloys of the system Fe—Ni—Nb—V—B (b=0 and g=0), which contain elements with a high melting point (Nb: 2469° C., V: 1910° C.), specimens of the two eutectic binary compositions $Ni_{58.5}Nb_{41.5}$ (Tm=1184° C.) and $Ni_{50}V_{50}$ (Tm=1220° C.) can be produced, then quantities corresponding to the percentages of V and Nb are mixed. In parallel, the quantities of Fe and B are melted together, then with the remaining quantity of Ni. Finally, the final alloy specimen is produced by melting the three pre-alloys (NiNb+NiV+FeB) and the balance of the pure elements.

The steps mentioned above and their sequence constitute a nonlimiting example for preparing the amorphous metal alloy. The method as described provides reliable and reproducible production, and also makes it possible to maximize the thickness limit for which the alloy remains ductile. An amorphous alloy can be produced omitting one or more steps, or modifying the conditions used, but generally to the detriment of the reliability of the method and the maximum thickness.

EXAMPLES

I) Experimental Techniques

1) Manufacture of Ribbons

Substantially amorphous metal alloys were prepared and then cast directly in the form of ribbons by PFC.

A target thickness of 65 µm is set, in order to compare the alloys with one another. In fact, the properties of the specimens, such as ductility, resistance to embrittlement on annealing, Young's elastic modulus and the glass transition temperature (Tg) depend on the cooling rate of the alloy, and therefore intrinsically on the thickness of the ribbon.

2) Measurements of Bending

The mechanical properties in bending are measured with a 2-point bending tester. In this method, the specimen in the form of ribbon is curved in a U-shape between two parallel planes. One of the planes moves and the other remains fixed. The apparatus simultaneously measures the distance between the planes and the force produced by the specimen, as described for example in international patent application WO 2008125281. The advantages of this method are that the maximum stress is concentrated in a place that is not submitted to contact, it does not cause sliding of the specimen at the two points of support, which thus makes it possible to induce stresses reliably and reproducibly, as well as large strains.

For each ribbon, three specimens with a length of 75 mm are tested in bending. Measurement starts with an initial spacing of 16 mm and is stopped at a final spacing of 2.3 mm with a speed of displacement of 0.2 mm/s. After this cycle of loading/unloading, the specimen is plastically deformed locally.

For all the alloys produced, it was verified that the elastic strain was close to 2%. The elastic modulus was therefore adopted as an indicator of the mechanical strength of the specimens.

As the cross section of the ribbons is not perfectly rectangular (trapezoidal shape directly after solidification), the modulus deduced from the measurements must be regarded as a quantity that is representative of the apparent bending stiffness, which makes it possible to compare the alloys with one another, and not as the true value of the Young's modulus of the material. Nevertheless, the values presented are corrected with a form factor to take best account of the true moment of inertia and are relatively close to the expected values of the Young's modulus for alloys of this type, as well as values deduced from tensile testing.

3) Calorimetric Measurements

The thermal properties of the metallic glasses or of the amorphous metal alloys (glass transition temperature Tg, crystallization temperature Tx) are measured by differential scanning calorimetry (DSC) on apparatus of the Setaram Setsys Evolution 1700 type, during a heating ramp at 20° C./min under an argon stream of quality 6 (20 ml/min). The measured specimen weight is from 30 to 50 mg. The pieces of ribbon are put in an alumina crucible.

4) X-Ray Diffraction Measurements

This technique is used for verifying the amorphous character of the ribbons obtained. The measurements were carried out on apparatus of the Xpert-PRO MPD type from Panalytical. If the signal measured does not have a diffraction peak, the alloy is considered to be amorphous (AM), rather than a crystalline alloy (CR). The limit of detection of a crystalline phase is generally located at 5% (volume fraction of the crystalline phase), and the depth probed during the measurement is typically 5 µm, or well below the typical thickness of the ribbon.

5) Measurements of Brittleness on Annealing

The use of ribbons of amorphous or substantially amorphous metal alloys as springs, notably in a mechanism and particularly as a spring, requires a step of forming of the ribbon. This forming can be performed hot and/or cold.

In the case of cold forming (and mechanical loading of the component), the alloy must display ductile behavior. The ductile or brittle character of a ribbon is assessed by folding at 180°. It is considered to be ductile if, once folded on itself at 180°, it does not break into two parts. The ribbon is considered to be partially ductile if it breaks before reaching an angle of folding of 180°, but it shows an increase in plasticity at the place of the fold. This test makes it possible to assess whether the deformation at rupture occurs in the plastic range, and represents a very strict criterion which corresponds to several tens of percent of deformation in the surface fibers.

In the case of hot forming, it is important that the ribbon does not lose its initial ductile character following the annealing treatment. To verify that there is a treatment window (time/temperature) that permits forming without embrittlement, annealing operations were carried out on initially straight strips with a length of 30 mm coiled up inside aluminum rings with an inside diameter of 7.8 mm, either in a furnace, or by heating by a jet of hot gas.

Once the strip has cooled, the diameter of curvature of the relaxed strip is measured with a caliper gauge. The relaxed strip is then placed between the two flats of the caliper gauge as in a 2-point bending test and the distance apart at rupture is recorded while slowly bringing the two flats closer together. The fixing coefficient is calculated as the ratio of the inside diameter of the ring $D_0$ and the diameter of curvature of the relaxed strip $D_f$ (see above-mentioned international applications WO2010/000081 and WO2011/069273).

An alloy that is initially ductile will, during annealing at a given temperature (in this case, $0.8T_g<T<T_g$), become brittle after a given annealing time $t_0$. During this time $t_0$ that is available before embrittlement of the alloy, it is possible to reach a certain fixing coefficient.

Evaluation of the annealing resistance of the alloys is based essentially on these two criteria: maximize the time for embrittlement in annealing $t_0$ at a given temperature and maximize the fixing coefficient obtained at time $t_0$. In practice, it is considered that the capacity for annealing is good if there is a treatment time and a treatment temperature such that the ribbon remains ductile after heat treatment, with a degree of fixing>50%.

II) Tests

1) Fe—(Co)—Ni—Nb—V—B System

Table 1 below describes the various alloys produced with the elements Fe(Co)NiNbVB.

A specimen having a weight varying between 11.0 and 13.5 g was used for each test.

First, the nickel content was varied in a range from 18 to 22 at %, and the niobium content from 6 to 8 at %. The concentrations of vanadium and of boron were kept constant at 5 at % and 15 at % respectively.

Secondly, the ratio between the two refractory metals V and Nb was varied. A concentration of V of 9 at % leads to embrittlement of the alloy, according to the very strict criterion of the folding test at 180° C.

In other tests (not shown in the table) that were carried out with a niobium concentration exceeding 10 at %, formation of an intermetallic with a high melting point is observed, which makes it difficult to produce ribbons by PFC.

The mechanical and thermal properties depend essentially on the concentration of Nb. The alloys with a concentration of Nb of 8 and 10 at % are brittle or quickly become brittle during the heat treatment for forming, according to the very strict criterion of the folding test at 180° C. Good ductility after annealing is seen for the alloys having 6 at % of Nb, but at the expense of the (apparent) elastic modulus, which is lowered.

much lower than this value, and probably well below 10%. It can therefore be stated that the total crystalline volume fraction is lower than 50% for all the alloys measured. It should be noted that the exact value of the volume fraction for a given composition and a given thickness also depends on the conditions of production (casting temperature, surface condition of the wheel, alloy of the wheel, etc.), which are just as much parameters that influence the cooling rate.

TABLE 1

| Alloys | Composition | | | | | | Base a+b+c | Refr: d+e | Thickness [μm] | Structure (XRD) Free side | Wheel side | DSC Tg [° C.] | Tx [° C.] | Ductility (180° test) | E [GPa] | Resistance to annealing |
|---|---|---|---|---|---|---|---|---|---|---|---|---|---|---|---|---|
| | Fe a | Co b | Ni c | Nb d | V e | B f | | | | | | | | | | |
| $Fe_{50}Ni_{22}Nb_8V_5B_{15}$ | 50 | — | 22 | 8 | 5 | 15 | 72 | 13 | 67 | AM | AM | 495 | 535 | partial | 157 | No |
| $Fe_{52}Ni_{20.66}Nb_{7.33}V_5B_{15}$ | 52 | — | 20.7 | 7.33 | 5 | 15 | 72.66 | 12.33 | 70 | AM/CR | AM | 485 | 514 | partial | 153 | No |
| $Fe_{56}Ni_{18}Nb_6V_5B_{15}$ | 56 | — | 18 | 6 | 5 | 15 | 74 | 11 | 67 | AM/CR | AM | 477 | 504 | ductile | 155 | Yes |
| $Fe_{54}Ni_{20}Nb_6V_5B_{15}$ | 54 | — | 20 | 6 | 5 | 15 | 74 | 11 | 69 | AM/CR | AM | 471 | 499 | ductile | 152 | No |
| $Fe_{52}Ni_{22}Nb_6V_5B_{15}$ | 52 | — | 22 | 6 | 5 | 15 | 74 | 11 | 66 | AM/CR | AM | 449 | 494 | ductile | 154 | Yes |
| $Fe_{48}Ni_{22}Nb_6V_9B_{15}$ | 48 | — | 22 | 6 | 9 | 15 | 70 | 15 | 63 | n.a. | n.a. | 474 | 512 | partial | 153 | No |
| $Fe_{52}Ni_{22}Nb_4V_7B_{15}$ | 52 | — | 22 | 4 | 7 | 15 | 74 | 11 | 67 | n.a. | n.a. | 448 | 487 | ductile | 139 | Yes |
| $Fe_{50}Ni_{22}Nb_6V_7B_{15}$ | 50 | — | 22 | 6 | 7 | 15 | 72 | 13 | 63 | AM | AM | 471 | 500 | ductile | 151 | Yes |
| $Fe_{30}Co_{20}Ni_{22}Nb_8V_5B_{15}$ | 30 | 20 | 22 | 8 | 5 | 15 | 72 | 13 | 66 | n.a. | n.a. | 473 | 510 | ductile | 150 | Yes |
| $Fe_{36}Co_{24}Ni_{12}Nb_8V_5B_{15}$ | 36 | 24 | 12 | 8 | 5 | 15 | 72 | 13 | 64 | n.a. | n.a. | 485 | 522 | ductile | 153 | Yes |

AM = completely amorphous
AM/CR = having a crystalline phase
n.a. = not available/measurement not carried out The alloys that are considered to be brittle following the folding test at 180° C. are not suitable for use as a high-performance spring, but can certainly be used in applications with loading conditions that are less severe. Moreover, alloys that do not have adequate annealing resistance can still be perfectly usable in applications not requiring forming of the ribbon or wire, notably a hot forming step.

Certain compositions, for example the composition $Fe_{52}Ni_{22}Nb_6V_5B_{15}$, display however quite remarkable properties, i.e. a high Young's modulus combined with good ductility at a thickness of at least 65 μm, even after heat treatment for forming.

The ribbons obtained have a thickness varying from 62 to 68 μm in 90% of cases, or very close to the target thickness of 65 μm. In most cases the critical thickness is not reached and ribbons of larger thickness can be produced. This limit can also be pushed back by increasing the cooling rate.

Table 1 also supplies an important finding: the great majority of ductile ribbons have a peak of a crystalline phase on the "free" side of the ribbon, i.e. the face in contact with the atmosphere, in contrast to the "wheel" face that was in contact with the copper wheel. This crystalline phase, indicated by AM/CR in the table, is formed of nanocrystals, whose size is estimated at 8-10 nm by measuring the width of the X-ray diffraction peaks, dispersed in the amorphous matrix. It is known that the presence of nanocrystals can, under certain conditions, favor the plasticity of metallic glasses [Hajlaoui et al., Shear delocalization and crack blunting of a metallic glass containing nanoparticles: In situ deformation in TEM analysis, Scripta materiala 54, 1829 (2006)]. However, no correlation is observed between the presence or absence of this phase and the ductility of the alloy.

X-ray diffraction measurements make it possible to estimate the total volume fraction. The intensity of the signal from the crystalline phase detected on the "free" side typically corresponds to 15% of the volume fraction of the depth probed, which is about 5 μm. As no crystalline phase is detected on the "wheel" side, the total volume fraction is It can be seen that in nearly all cases, the elastic modulus E is above 150 GPa.

The role of the refractory elements in the alloys according to the invention corresponds to what is called "minor alloying", which has a driving effect in the formation of glass [Wang et al., Co- and Fe-based multicomponent bulk metallic glasses designed by cluster line and minor alloying, Journal of Materials Research 23, 1543 (2007)]. In the alloy system according to the invention, the role of the refractory elements (Nb, V) is not limited to promoting the formation of the glass, as they modify the mechanical properties such as hardness and ductility. In this context, the content of V was increased without that of Nb exceeding 6%. The results presented in Table 1 do not show a significant improvement of the various properties of the strip, except hardness (not shown), which is slightly increased.

The alloy $Fe_{52}Ni_{22}Nb_6V_5B_{15}$ is ferromagnetic with a Curie point of 453 K (180° C.), which is lower than the Curie point of the Fe—B amorphous binary alloys. This drop is attributed to the addition of elements of addition, especially of Nb, which is an element that is known to have this effect [Yavari et al., On the Nature of the Remaining Amorphous Matrix after Nanocrystallization of Fe77Si14B9 with Cu and Nb Addition, Materials Science and Engineering A182, 1415 (1994)].

It will also be noted that by partial replacement of Fe with Co, the alloy can absorb 8 at % of Nb without the ductility of the ribbon being compromised (in comparison with $Fe_{50}Ni_{22}Nb_8V_5B_{15}$).

2) Co—Ni—Nb—V—B System

The Co-based alloys investigated are listed in Table 2. In the Co—Ni—Nb—V—B system, it was possible to increase the Nb content beyond the ductile/brittle barrier of 6 at % of the Fe—Ni—Nb—V—B system, which makes it possible to obtain higher values of hardness and of elastic modulus. In contrast, this barrier is located at 8 at % for this system. The content of metalloid B is limited to 15 at %, and "minor alloying" with Ta makes it possible to preserve the ductility and hardness but lowers the value of elastic modulus slightly.

In this system, the elements based on cobalt and nickel play an essential role for the values of elastic modulus and annealing resistance. Cobalt advantageously replaces iron in all aspects but without nickel the alloy suffers an appreciable loss of hardness. The maximum apparent elastic modulus occurs at 167 GPa for the composition $Co_{50}Ni_{22}Nb_8V_5B_{15}$, but it is not possible to state that this is an optimum for this system. It can also be seen that a ductile strip of 86 µm was produced. The critical ductile/brittle thickness has not, however, been reached and is greater than 86 µm.

It can be seen that in all cases, the elastic modulus E is above 150 GPa. The observations made above concerning the presence of a crystalline phase on the "free" side of the ribbons obtained in Fe-based alloys (Table 1) also apply to the Co-based alloys presented in Table 2.

Certain compositions, for example the composition $Co_{50}Ni_{22}Nb_8V_5B_{15}$, thus display quite remarkable properties, i.e. a high Young's modulus combined with good ductility at a thickness of at least 80 µm, even after heat treatment for forming. It appears that this is the first time that an amorphous metal alloy combining these various characteristics has been obtained.

The alloy $Co_{50}Ni_{22}Nb_8V_5B_{15}$ is clearly paramagnetic at room temperature, as saturation magnetization is not reached even with a magnetic field of 3 tesla. This paramagnetic behavior is added to the very desirable mechanical properties (elastic modulus and hardness) and the increased resistance to embrittlement.

TABLE 2

| Alloys | Composition Co b | Ni c | Nb d | V e | Ta g | B f | Base a+b+c | Refr d+e | Thickness [µm] | Structure (XRD) Free side | Wheel side | Ductility (180° test) | E [GPa] | Resistance to annealing |
|---|---|---|---|---|---|---|---|---|---|---|---|---|---|---|
| $Co_{50}Ni_{18}Nb_{12}V_5B_{15}$ | 50 | 18 | 12 | 5 | | 15 | 68 | 17 | 63 | AM | AM | partial | 169 | No |
| $Co_{54}Ni_{14}Nb_{12}V_5B_{15}$ | 54 | 14 | 12 | 5 | | 15 | 68 | 17 | 63 | AM | AM | partial | 169 | No |
| $Co_{32}Ni_{40}Nb_8V_5B_{15}$ | 32 | 40 | 8 | 5 | | 15 | 72 | 13 | 65 | AM/CR | AM | ductile | 162 | Yes |
| $Co_{40}Ni_{32}Nb_8V_5B_{15}$ | 40 | 32 | 8 | 5 | | 15 | 72 | 13 | 68 | AM/CR | AM | ductile | 163 | Yes |
| $Co_{42}Ni_{30}Nb_8V_5B_{15}$ | 42 | 30 | 8 | 5 | | 15 | 72 | 13 | 66 | AM/CR | AM | ductile | 160 | Yes |
| $Co_{50}Ni_{22}Nb_8V_5B_{15}$ | 50 | 22 | 8 | 5 | | 15 | 72 | 13 | 65 | AM/CR | AM | ductile | 167 | Yes |
| $Co_{50}Ni_{22}Nb_4Ta_4V_5B_{15}$ | 50 | 22 | 4 | 5 | 4 | 15 | 72 | 13 | 67 | AM/CR | AM | ductile | 164 | Yes |

AM = completely amorphous
AM/CR = having a crystalline phase

It can be seen that replacement of Fe with Co gives quite remarkable results, as shown in Table 2. A $Co_{50}Ni_{22}Nb_8V_5B_{15}$ strip with a thickness of 65 µm thus displays a very high annealing resistance (time of ductile-brittle transition almost 15 min at 340° C., or 0.8 Tg [K]) and an elastic modulus of 167 GPa. Moreover, this alloy is paramagnetic at room temperature, in contrast to the Fe-based alloys produced up to now.

The invention claimed is:

1. An amorphous metal alloy corresponding to the formula $$Fe_aCo_bNi_cNb_dV_eB_fTa_g$$

in which:
$0 \leq a \leq 70$;
$0 \leq b \leq 70$;
$8 < c \leq 60$;
$1 \leq d \leq 19$;
$1 \leq e \leq 10$;
$12 < f \leq 25$;
$0 \leq g \leq 5$;
with
$20 \leq a+b \leq 70$;
$50 \leq a+b+c \leq 86$;
$8 \leq d+e \leq 20$; and
$a+b+c+d+e+f+g=100$.

2. The amorphous metal alloy as claimed in claim 1, in which:
$0 \leq a \leq 60$;
$0 \leq b \leq 60$;
$10 \leq c \leq 50$;
$2 \leq d \leq 17$;
$2 \leq e \leq 8$;
$14 \leq f \leq 20$;
$0 \leq g \leq 4$;
with
$25 \leq a+b \leq 65$;
$60 \leq a+b+c \leq 80$; and
$8 \leq d+e \leq 17$.

3. The amorphous metal alloy as claimed in claim 2, in which:
$0 \leq a \leq 56$;
$0 \leq b \leq 54$;
$12 \leq c \leq 40$;
$4 \leq d \leq 14$;
$4 \leq e \leq 6$;
$15 \leq f \leq 17$;
$0 \leq g \leq 4$;
with
$30 \leq a+b \leq 60$;
$68 \leq a+b+c \leq 75$; and
$11 \leq d+e \leq 15$.

4. The amorphous metal alloy as claimed in claim 3, in which the alloy is selected from the following alloys:
$Co_{50}Ni_{18}Nb_{12}V_5B_{15}$;
$Co_{54}Ni_{14}Nb_{12}V_5B_{15}$;
$Co_{32}Ni_{40}Nb_8V_5B_{15}$;
$Co_{40}Ni_{32}Nb_8V_5B_{15}$;
$Co_{42}Ni_{30}Nb_8V_5B_{15}$;
$Co_{50}Ni_{22}Nb_8V_5B_{15}$; and
$Co_{50}Ni_{22}Nb_4Ta_4V_5B_{15}$.

5. The amorphous metal alloy as claimed in claim 4, in which the alloy is selected from the following alloys:
$Co_{32}Ni_{40}Nb_8V_5B_{15}$;
$Co_{40}Ni_{32}Nb_8V_5B_{15}$;
$Co_{42}Ni_{30}Nb_8V_5B_{15}$;
$Co_{50}Ni_{22}Nb_8V_5B_{15}$; and
$Co_{50}Ni_{22}Nb_4Ta_4V_5B_{15}$.

6. The amorphous metal alloy as claimed in claim 1, in which g=0.

7. The amorphous metal alloy as claimed in claim 1, in which a=0.

8. The amorphous metal alloy as claimed in claim 7, in which:
   $31 \leq b \leq 56$;
   $13 \leq c \leq 41$;
   $7 \leq d \leq 13$;
   $4 \leq e \leq 10$; and
   $13 \leq f \leq 17$.

9. The amorphous metal alloy as claimed in claim 1, in which b=0.

10. The amorphous metal alloy as claimed in claim 1, in which:
    $47 \leq a \leq 57$;
    $17 \leq c \leq 23$;
    $3 \leq d \leq 9$;
    $4 \leq e \leq 10$
    $13 \leq f \leq 17$; and
    g=0.

11. The amorphous metal alloy as claimed in claim 1, in which the alloy is selected from the following alloys:
    $Fe_{50}Ni_{22}Nb_8V_5B_{15}$;
    $Fe_{52}Ni_{20.66}Nb_{7.33}V_5B_{15}$;
    $Fe_{56}Ni_{18}Nb_6V_5B_{15}$;
    $Fe_{54}Ni_{20}Nb_6V_5B_{15}$;
    $Fe_{52}Ni_{22}Nb_6V_5B_{15}$;
    $Fe_{48}Ni_{22}Nb_6V_9B_{15}$;
    $Fe_{52}Ni_{22}Nb_4V_7B_{15}$;
    $Fe_{50}Ni_{22}Nb_6V_7B_{15}$;
    $Fe_{30}Co_{20}Ni_{22}Nb_8V_5B_{15}$; and
    $Fe_{36}Co_{24}Ni_{12}Nb_8V_5B_{15}$.

12. The amorphous metal alloy as claimed in claim 11, in which the alloy is selected from the following alloys:
    $Fe_{56}Ni_{18}Nb_6V_5B_{15}$;
    $Fe_{52}Ni_{22}Nb_6V_5B_{15}$;
    $Fe_{52}Ni_{22}Nb_4V_7B_{15}$;
    $Fe_{50}Ni_{22}Nb_6V_7B_{15}$;
    $Fe_{30}Co_{20}Ni_{22}Nb_8V_5B_{15}$; and
    $Fe_{36}Co_{24}Ni_{12}Nb_8V_5B_{15}$.

13. The amorphous metal alloy as claimed in claim 12, in which the alloy is selected from the alloys $Fe_{30}Co_{20}Ni_{22}Nb_8V_5B_{15}$ and $Fe_{36}Co_{24}Ni_{12}Nb_8V_5B_{15}$.

14. The amorphous metal alloy as claimed in claim 1, the alloy being a non pulverulent solid.

15. A spring comprising an amorphous metal alloy according to claim 1.

16. A method of preparing an alloy as claimed in claim 1, in which, under an inert atmosphere:
   a) pre-melting of the pure metallic elements Fe and/or Co, Ni, Nb and V is carried out in a container;
   b) boron is heated, so as to remove any gas molecules that it contains;
   c) the pre-melted metallic elements and the solid boron are mixed;
   d) the mixture obtained is heated;
   e) it is cooled;
   f) optionally steps d) and e) are repeated one or more times, the last step e) being a hyperquench,
   so as to obtain the amorphous metal alloy of claim 1.

17. The method as claimed in claim 16, in which step c) is divided into substeps of formation of partial mixtures so as to form pre-alloys whose melting point is below that of the individual constituents.

18. The method as claimed in claim 16, in which, it comprises a step of casting the amorphous metal alloy in the form of ribbon or wire.

19. The method as claimed in claim 18, in which hyperquenching and casting in the form of ribbon or wire are performed simultaneously.

20. The method as claimed in claim 16, in which hyperquenching and casting are carried out by PFC.

21. The method as claimed in claim 16, in which, Ta is added.

22. The method as claimed in claim 21, wherein Ta is pre-melted in step a).

23. A method of making a spring, comprising forming the amorphous metal alloy according to claim 1 into the spring.

* * * * *